US012620900B1

(12) United States Patent
Tiwari et al.

(10) Patent No.: US 12,620,900 B1
(45) Date of Patent: May 5, 2026

(54) POWER CONVERTER WITH INTEGRATED SECONDARY MULTI-PURPOSE NETWORK

(71) Applicant: Navico Group Americas LLC, Menomonee Falls, WI (US)

(72) Inventors: Pallav Tiwari, Huizen (NL); Aleksandar Lazarov, Rotterdam (NL); Harm Hessels, IJsselstein (NL)

(73) Assignee: Navico Group Americas LLC, Menomonee Falls, WI (US)

( * ) Notice: Subject to any disclaimer, the term of this patent is extended or adjusted under 35 U.S.C. 154(b) by 230 days.

(21) Appl. No.: 18/640,352

(22) Filed: Apr. 19, 2024

(51) Int. Cl.
H02M 3/158 (2006.01)

(52) U.S. Cl.
CPC ................................. H02M 3/1582 (2013.01)

(58) Field of Classification Search
CPC ................................................... H02M 3/1582
See application file for complete search history.

(56) References Cited

U.S. PATENT DOCUMENTS

| | | | |
|---|---|---|---|
| 6,031,702 A | 2/2000 | Williams | |
| 9,350,185 B2 | 5/2016 | Longdon | |
| 10,978,948 B2 | 4/2021 | Du | |
| 11,077,765 B2 | 8/2021 | Takemoto | |
| 2017/0302179 A1* | 10/2017 | Bandyopadhyay ... | H02M 3/158 |
| 2018/0054178 A1* | 2/2018 | Bergsma .................. | H03H 7/07 |
| 2024/0056056 A1* | 2/2024 | Blin ..................... | H03H 11/245 |
| 2024/0235368 A1* | 7/2024 | Lee ........................... | H02J 7/06 |

OTHER PUBLICATIONS

Tiwari et al., Declaration of Prior Art, executed Jul. 30, 2024.

* cited by examiner

*Primary Examiner* — Rafael O De Leon Domenech
(74) *Attorney, Agent, or Firm* — Andrus Intellectual Property Law, LLP

(57) ABSTRACT

A power converter includes a DC-DC converter configured to operate in at least a boost mode so as to step up a first voltage input at a low side terminal to a second voltage output at a high side terminal. A first transistor is provided and has a body diode oriented in a first direction. A second transistor having a body diode oriented in an opposite second direction is also provided. The first and second transistors are in series with one another and are electrically connected between the low side terminal and the DC-DC converter. A third transistor is connected between a common terminal and the DC-DC converter. The first, second, and third transistors are controllable as switches to at least temporarily operate the power converter to step down the first voltage input at the low side terminal to a third voltage output at the high side terminal.

10 Claims, 6 Drawing Sheets

POWER CONVERTER WITH INTEGRATED SECONDARY MULTI-PURPOSE NETWORK

FIELD

The present disclosure relates to power converters including DC-DC converters configured to operate in at least boost mode.

BACKGROUND

Bidirectional (buck-boost) DC-DC converters are known. Such DC-DC converters operate in both a buck mode to step down voltage and a boost mode to step up voltage and include diodes, transistors (e.g., MOSFETs), and a capacitor and/or and an inductor for providing such functionality.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One example of the present disclosure contemplates a power converter comprising a low side terminal, a high side terminal, and a common terminal. A DC-DC converter is electrically connected between the high side terminal and the low side terminal. The DC-DC converter is configured to operate in at least a boost mode so as to step up a first voltage input at the low side terminal to a second voltage output at the high side terminal. A first transistor is provided and has a body diode oriented in a first direction. A second transistor having a body diode oriented in an opposite second direction is also provided. The first and second transistors are in series with one another and are electrically connected between the low side terminal and the DC-DC converter. A third transistor is connected between the common terminal and the DC-DC converter. The first, second, and third transistors are controllable as switches to at least temporarily operate the power converter to step down the first voltage input at the low side terminal to a third voltage output at the high side terminal.

According to one aspect, the power converter further comprises a gate driver controlling operation of the first, second, and third transistors as switches. The gate driver is configured to turn the first and second transistors on and simultaneously to turn the third transistor off. The gate driver is also configured to turn the third transistor on and simultaneously to turn the first and second transistors off.

According to one aspect, the power converter further comprises a controller in signal communication with the gate driver. The controller is configured to compare a measured voltage at the high side terminal to a measured voltage at the low side terminal. In response to determining that the measured voltage at the high side terminal is less than the measured voltage at the low side terminal, the controller controls the gate driver to operate the first, second, and third transistors as switches to step down the first voltage input at the low side terminal to the third voltage output at the high side terminal. In response to determining that the measured voltage at the high side terminal is greater than the measured voltage at the low side terminal, the controller controls the DC-DC converter to operate in the boost mode.

According to one aspect, the power converter further comprises a fourth transistor having a body diode oriented in the first direction and a fifth transistor having a body diode oriented in the second direction. The fourth and fifth transistors are in series with one another and in parallel with the first and second transistors, and are electrically connected between the low side terminal and the DC-DC converter. The first, second, third, fourth, and fifth transistors are controllable as switches to at least temporarily operate the power converter to step down the first voltage input at the low side terminal to the third voltage output at the high side terminal.

According to one aspect, the first and second transistors are oriented such that their respective sources face one another.

According to one aspect, the third transistor is connected between the common terminal and the DC-DC converter and between the first transistor and the common terminal.

According to one aspect, the DC-DC converter is also configured to operate in a buck mode so as to step down the second voltage input at the high side terminal to the first voltage output at the low side terminal.

According to one aspect, the DC-DC converter has an interleaved topology.

According to one aspect, the DC-DC converter is a non-isolated converter.

According to one aspect, at least one of the first, second, and third transistors is a MOSFET.

BRIEF DESCRIPTION OF THE DRAWINGS

The present disclosure is described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
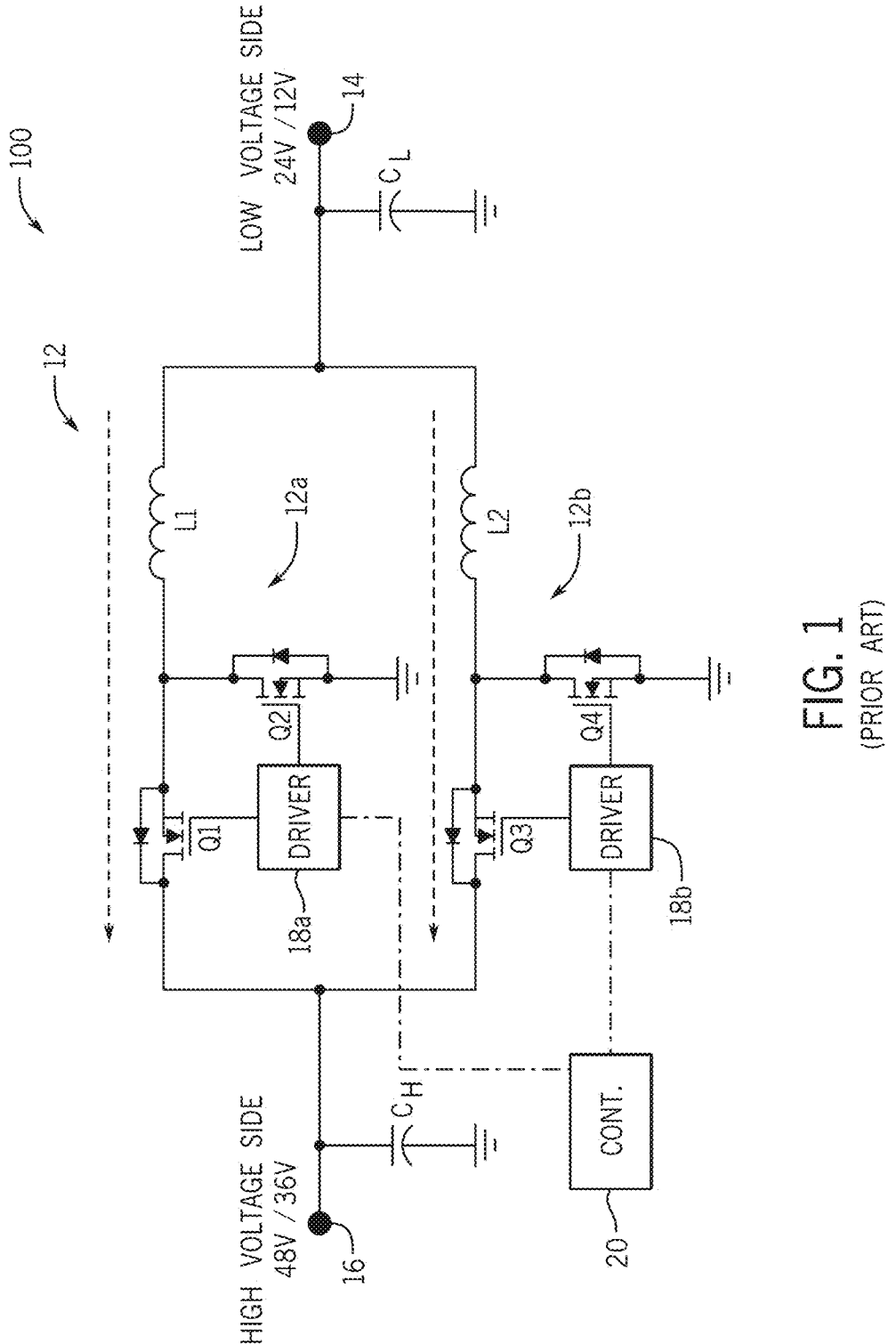
FIG. 1 illustrates a power converter with a prior art bidirectional interleaved DC-DC converter.

FIG. 1 illustrates a prior art power converter 100 including a DC-DC converter 12 connected between a low side terminal 14 and a high side terminal 16. Although the low side terminal 14 is shown as being nominal 24 volts or nominal 12 volts, and the high side terminal 16 is shown as being nominal 48 volts or nominal 36 volts, the nominal voltages at the terminals could be other than those shown here and are not limiting on the scope of the present disclosure. A first capacitor $C_L$ is provided between the low side terminal 14 and the DC-DC converter 12, and a second capacitor $C_H$ is provided between the high side terminal 16 and the DC-DC converter 12. The DC-DC converter is a bidirectional (buck-boost) converter having an interleaved topology, that is, a first DC-DC converter 12a is controlled with a switching frequency that is phase shifted with respect to that of a second DC-DC converter 12b. However, the DC-DC converters 12a, 12b could have a parallel topology. Alternatively, only one DC-DC converter could be provided. The DC-DC converters 12a, 12b are non-isolated.

Each DC-DC converter 12a, 12b comprises a first metal oxide field effect transistor (MOSFET) Q1, Q3 and a second MOSFET Q2, Q4, operation of which are controlled by a respective gate driver 18a, 18b. In another example, a separate gate driver is provided for each of the MOSFETS Q1-4. In another example, Q2 and Q4 can be replaced by diodes or could be semiconductor switches other than MOSFETs as shown here. The DC-DC converter 12a includes an inductor L1 and the DC-DC converter 12b includes an inductor L2. A controller 20 is in signal communication with the gate drivers 18a, 18b and controls the gate drivers 18a, 18b to operate the DC-DC converters 12a, 12b in a buck mode or in a boost mode. The controller 20 may operate the DC-DC converters 12a, 12b in the buck mode versus the boost mode (and vice versa) in response to user selection via an input switch or via a user-selected software configuration, or in response to a determination by the controller 20 that one or the other mode is required given measured/sensed circumstances.

In buck mode, the controller 20 is configured to step down a higher voltage input at the high side terminal 16 to a lower voltage output at the low side terminal 14. To do so, the controller controls the gate driver 18a to close Q1 and to open Q2 such that voltage input at the high side terminal 16 induces a current in the inductor L1; the controller 20 then controls the gate driver 18a to open Q1 and close Q2 such that current from the inductor L1 is provided to the low side terminal 14; the controller 20 then controls the gate driver 18a again to close Q1 and to open Q2, and so on. Out of phase with this switching of Q1 and Q2, the controller controls the gate driver 18b to close Q3 and to open Q4 such that voltage input at the high side terminal 16 induces a current in the inductor L2; the controller then controls the gate driver 18b to open Q3 and close Q4 such that current from the inductor L2 is provided to the low side terminal 14; the controller 20 then controls the gate driver 18b again to close Q3 and to open Q4, and so on. The capacitor $C_L$ stores and releases the energy to smooth voltage spikes that may otherwise result from such switching.

In boost mode, the controller 20 is configured to step up a lower voltage input at the low side terminal 14 to a higher voltage output at the high side terminal 16. To do so, the controller 20 controls the gate driver 18a to close Q2 and to open Q1 such that voltage input at the low side terminal 14 induces a current in the inductor L1; the controller 20 then controls the gate driver 18a to close Q1 and open Q2 such that current from the inductor L1 and current from the low side terminal 14 is provided to the high side terminal 16; and so on. Out of phase with this switching of Q1 and Q2, the controller controls the gate driver 18b to close Q4 and to open Q3 such that voltage input at the low side terminal 14 induces a current in the inductor L2; the controller 20 then controls the gate driver 18b to close Q3 and open Q4 such that current from the inductor L2 and current from the low side terminal 14 is provided to the high side terminal 16; and so on. The capacitor $C_H$ stores and releases the energy to smooth voltage spikes that may otherwise result from such switching.

The bidirectional interleaved topology shown in FIG. 1 has the benefit of being simple and economical to implement, using parts that are easily sourced and mass-producible, while also providing high performance. However, while operating in boost mode, this topology can suffer from an intrinsic uncontrolled current flow under certain circumstances. This current flow occurs from the low side terminal 14 to the high side terminal 16 if the high side terminal 16 happens to have a lower voltage than that of the low side terminal 14. A typical scenario in which this would happen is if a battery connected to the high side terminal 16 is deeply depleted. Another scenario is when the power converter 100 is being used as, for example, a 48V or 36V power supply while there is a lower voltage (e.g., 12V or 24V) battery, power supply, or other energy source or sink connected to the low side terminal 14. The type of MOSFETs shown here (n-channel enhancement type) have intrinsic body diodes (parasitic diodes) that allow current to flow from the source to the drain, but not in the opposite direction. Because of the orientation of the intrinsic body diodes in MOSFETs Q1 and Q3, even when the DC-DC converter 12 is off (i.e., no active switching), the battery voltage from the low side terminal 14 will be present at the high side terminal 16. This is shown by the dashed line arrows in FIG. 1, which represent uncontrolled flow of current from the low side to the high side when the power converter 100 is operating in boost mode. There are three consequences of this uncontrolled current path: (1) depending on the load applied at the high side, an unregulated amount of current can overload both Q1 and/or Q3; (2) if there is a short circuit scenario on the high side, the current will flow through Q1 and Q3; and (3) there is no way to recover a flat battery on the high side in a manner that is good for the battery. Furthermore, the topology shown in FIG. 1 is subject to the risk of a single point of failure. A failure of either Q1 or Q3 that results in a short circuit can in turn result in high voltage being present on the low side terminal, which could potentially damage the battery or power supply connected to the low side terminal 14.

Some potential solutions to the issues noted above include using fuses at the output and input of the DC-DC converter 12, utilizing a separate system monitor that can disconnect the battery from the high side terminal 16 when the battery on the high side terminal 16 is deeply depleted, utilizing a soft-/pre-charger to charge the battery connected to the high side terminal 16 to a threshold level, or utilizing a crowbar circuit designed to trigger a fuse blow when high voltage is sensed on the low side. However, each of these potential solutions suffers from one or more drawbacks. Use of fuses for short-/over-current protection is a destructive method. The fuses would need to be replaced before the device can be used again, even after the fault condition has been cleared. Resettable fuses would eliminate this need but are costlier and more complex. The solutions for pre-charging a terminal are also costly and complex. Crowbar circuits can be expensive and require bulky components and additional fuses.

Therefore, recognizing the need for a power converter that does not suffer from uncontrolled current flow when in boost mode, which does not have a single point of failure, and which does not require an external charger or pre-charger, the present inventors have developed a solution that has the capability to ensure protection regardless of the failure of any one single power component, resulting in reduced cost and component count.

Figure 2:
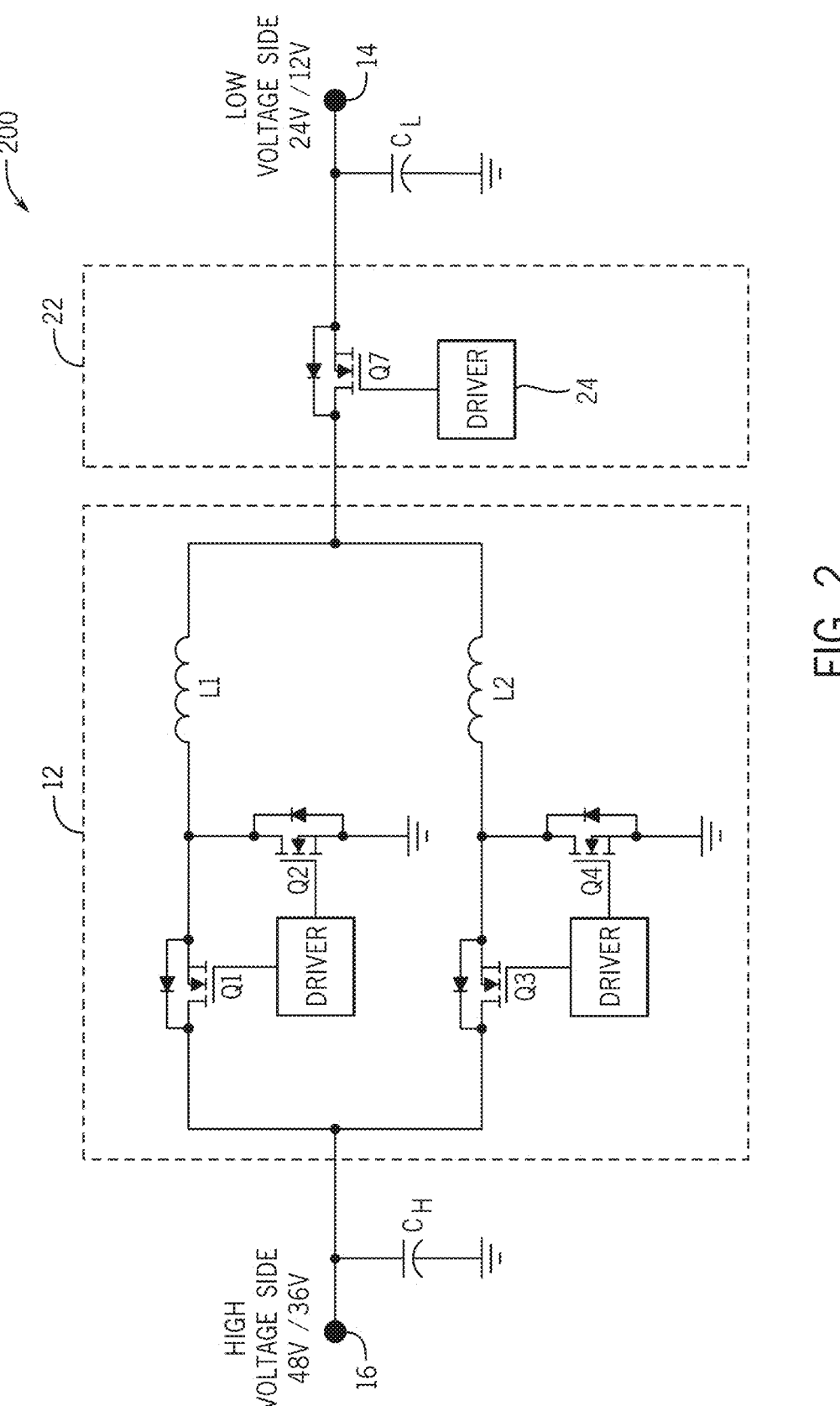
FIG. 2 illustrates the DC-DC converter of FIG. 1 with an additional switch added to prevent uncontrolled current flow through the DC-DC converter when operating in boost mode.

Referring to FIG. 2, to solve the issue of uncontrolled current flowing from the low side terminal 14 to the high side terminal 16 while the DC-DC converter 12 is operated in boost mode, a secondary switching element 22 in the form of an inline MOSFET Q7 is provided between the low side terminal 14 and the DC-DC converter 12. The MOSFET Q7 is configured to be controlled to break the flow of current, and the orientation of its body diode prevents an inherent uncontrolled current flow. Switching of the MOSFET Q7 is controlled by a gate driver 24, which is in signal communication with a controller (not shown). A shunt is provided that measures the current flowing through the inductors L1 and L2 of the DC-DC converter 12. If the rise in current exceeds a predetermined threshold, this is considered an overcurrent event. In response to detection of an overcurrent event when the DC-DC converter 12 is off (i.e., no active switching), the controller sends a signal to the gate driver 24 to open Q7, thereby preventing the flow of current from the low side to the high side. Because the body diode of the MOSFET Q7 faces the opposite direction from the body diodes of Q1 and Q3, current will not flow uncontrolled through Q7 when Q7 is open. When there is no overcurrent event, the controller controls the gate driver 24 to maintain Q7 closed so that current can flow from the low side to the high side.

However, even with the addition of Q7, the high side voltage can appear on the low side if Q1 or Q3 fails short, thereby allowing current to flow through Q1 or Q3. Even if Q7 is controlled to open, its body diode will inherently facilitate flow of current from the high side to the low side. Thus, referring to FIG. 3, the issue of high voltage appearing at the low side terminal 14 if Q1 or Q3 fails and shorts the circuit is solved by the addition of MOSFET Q6 in series with MOSFET Q7 and between the low side terminal 14 and the DC-DC converter 12. Together, Q6 and Q7 operate as a four-quadrant electronic switch 26 that is capable of disrupting current in either direction (high to low or low to high) and that is also capable of blocking voltage in either direction. The intrinsic body diode of MOSFET Q6 (which is oriented opposite that of Q7) does not allow current to flow from the high side to the low side and thus the high voltage will not appear at the low side terminal 14. Similar to the case described in FIG. 2, a controller (not shown) will send a signal to a gate driver 28 that controls switching of the MOSFETS Q6 and Q7 if an overcurrent event is detected, opening the normally closed switch 26. The gate driver 28 opens Q6 and Q7 together and closes Q6 and Q7 together; thus, when both Q6 and Q7 are closed, current can flow from the low side to the high side. When Q6 and Q7 are opened in response to an overcurrent event, current cannot flow from low to high due to the intrinsic body diode of Q7.

Addition of the two MOSFETs Q6 and Q7 results in losses that increase according to the square of the current flowing through each switch. Therefore, referring to FIG. 4, the secondary switching network 30 is expanded to include MOSFETs Q8 and Q9 so that the share of current, and thus the losses, are reduced for each switch. A gate driver 32 controls switching of the MOSFETs Q6-9 together in the same way and according to the same conditions as those discussed with respect to the gate driver 28 of FIG. 3. Note that Q8 and Q9 are in series with one another and in parallel with Q6 and Q7. Further, the intrinsic body diodes of Q8 and Q9 are oriented in opposite directions from one another, as with Q6 and Q7. Thus, Q8 and Q9 provide the same function of disrupting current in either direction (high to low or low to high) and blocking voltage in either direction as do Q6 and Q7. Note that further pairs of MOSFETs having opposed orientations could be provided in parallel with Q6 and Q7 and Q8 and Q9, but eventually the benefits from reduced losses would be overcome by increased cost and space taken up on the circuit board. Note also that as an alternative to the switches shown in FIG. 4, MOSFETs Q6-9 could be replaced by a relay.

Figure 3:
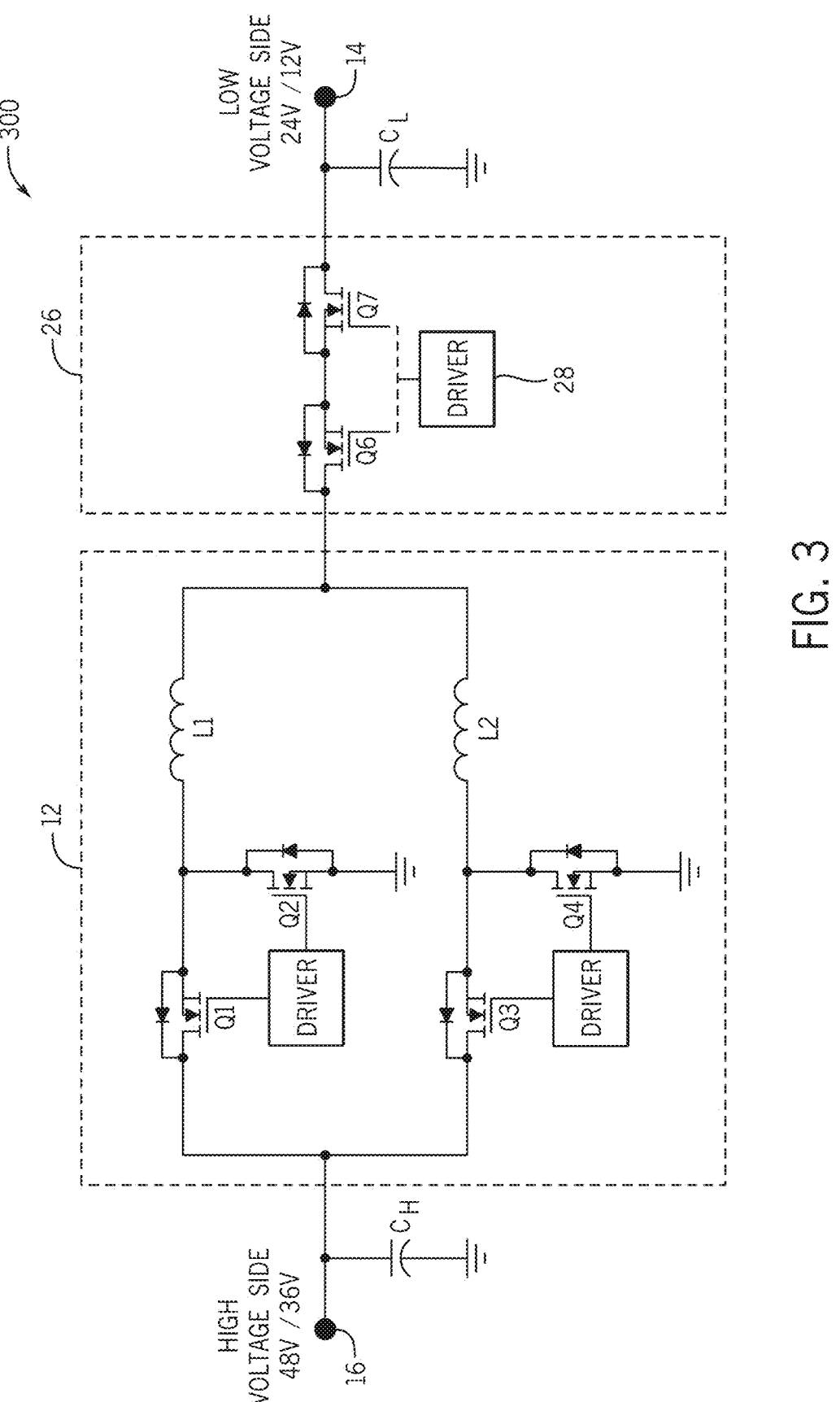
FIG. 3 illustrates the DC-DC converter with an electronic switch added that is capable of disrupting current in either direction (high to low or low to high) and that is also capable of blocking voltage in either direction.
Figure 5:
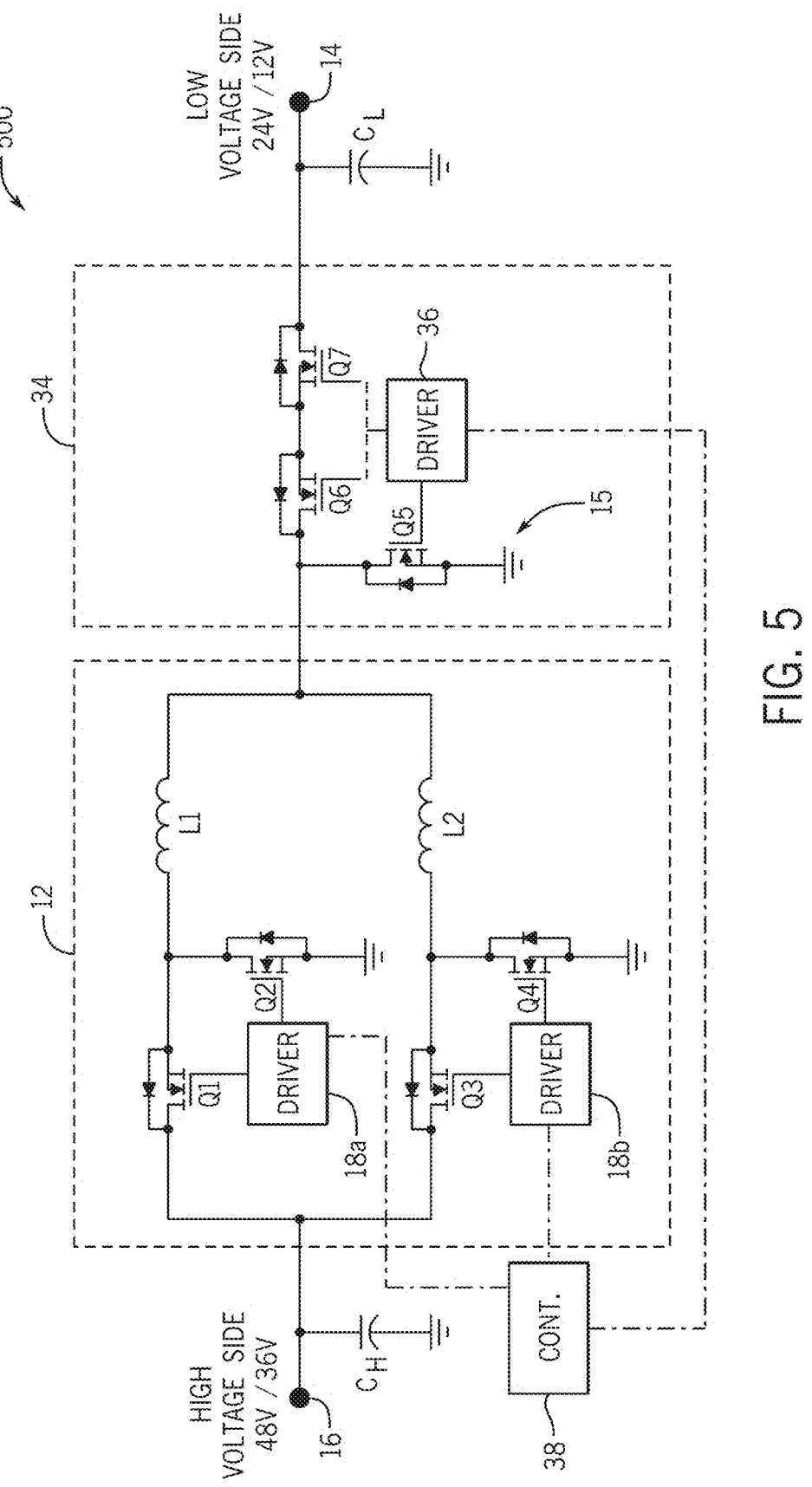
FIG. 5 illustrates the DC-DC converter with an electronic switch like that in FIG. 3, and with an additional switch added to the secondary switching network to control output at the high side terminal when the high side terminal is at a lower voltage than the low side terminal.

FIG. 5 shows a power converter 500 like the power converter 300 in FIG. 3, only with an additional MOSFET Q5 connected between the common terminal 15 and the DC-DC converter 12, which allows the power converter 500 to operate in a "buck-in-boost" mode. When the voltage at the high side terminal 16 is lower than that at the low side terminal 14, addition of Q5 allows the power converter 500 to be able to pre-charge the high side terminal 16 to charge a flat battery with reduced current. The secondary switching network 34 provided in FIG. 5 facilitates a step-down conversion in the boost direction, at least temporarily, while the battery connected to the high side terminal 16 is pre-charged. The gate driver 36 is configured to switch Q5 alternately with a combination of Q6 and 7, so as to step down the voltage input from the low side terminal 14 and provide a controlled voltage output at the high side terminal 16.

More specifically, a controller 38 is configured to send a signal to the gate driver 36 to control the MOSFETs Q5-7 depending on a comparison of the voltage at the high side versus the voltage at the low side. If, while the DC-DC converter 12 is operating in boost mode, the voltage at the high side is less than the voltage at the low side, the controller 38 causes the gate driver 36 to close MOSFETs Q6 and Q7 so that current can build up over inductors L1 and L2, while simultaneously opening MOSFET Q5. The gate driver 36 then opens Q6 and Q7 while simultaneously closing Q5, allowing the current to flow from the inductors L1 and L2 through the remainder of the circuitry of the DC-DC converter 12. The gate driver 36 then again closes MOSFETs Q6 and Q7 so that current can build up over inductors L1 and L2, while simultaneously opening MOS-FET Q5, and so on. The frequency of switching is controlled such that the current over L1 and L2 rises up and down in a controlled manner and on average provides a predetermined setpoint current value. While the power converter 500 is operating in this manner, the MOSFETs Q1-4 are all open. The body diodes of Q1 and Q3 allow the current to flow from the inductors L1, L2, respectively, to the high side terminal 16. Thus, although the power converter 500 overall is configured to operate in boost mode, the controller 38 (at least temporarily) stops controlling the DC-DC converter 12 from stepping up the voltage.

In this manner, a battery connected to the high side terminal 16 can accumulate charge in a controlled manner. Once the voltage at the high side exceeds the voltage at the low side, the controller 38 is configured to send a signal to the gate driver 36 to close Q6 and Q7 and open Q5 such that a constant flow of current is provided through Q6 and Q7 and the power converter 300 thereafter operates the DC-DC converter 12 in normal boost mode.

Moreover, the topology of the power converter 500 of FIG. 5 allows the device to be used as a power supply, in which case a load is applied at the high side that keeps the voltage at the high side lower than that at the low side. In this case, the controller 38 senses the lower voltage at the high side and switches Q5 and Q6/Q7 alternately to control the current output to the high side. In another example, a user can input a command to the controller 38 (such as via a switch or software user interface) that the device is to be used as a power supply and thus the controller 38 is to operate the switches Q5 and Q6/Q7 in this manner. In that case, the controller 38 does not need to continually monitor the voltage at the high side to determine if the power converter 500 should switch to boost mode.

Note that the controller 38 is also configured to open Q6 and Q7 if an overcurrent event occurs, as described hereinabove with respect to FIGS. 2 and 3.

An added benefit of the presence of Q5 is that if there is a short circuit on the high side as a result of which the controller 38 opens the MOSFETs Q6 and Q7, the intrinsic body diode of Q5 allows for the current built up in L1 and L2 to be discharged without negatively affecting the hardware in the converter.

Figure 4:
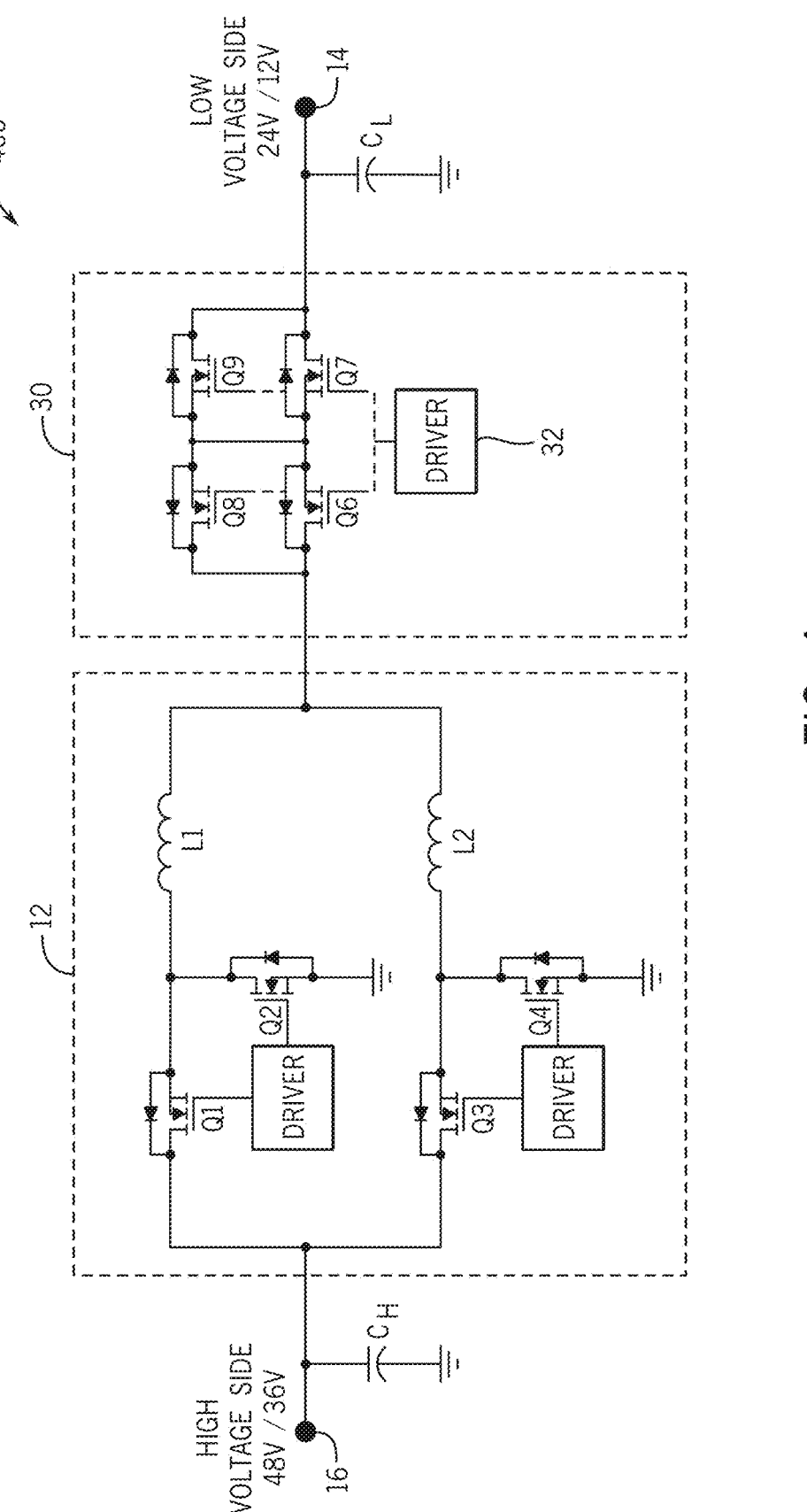
FIG. 4 illustrates the DC-DC converter with an electronic switch like that in FIG. 3, and with additional switches added to the secondary switching network to reduce switching losses.
Figure 6:
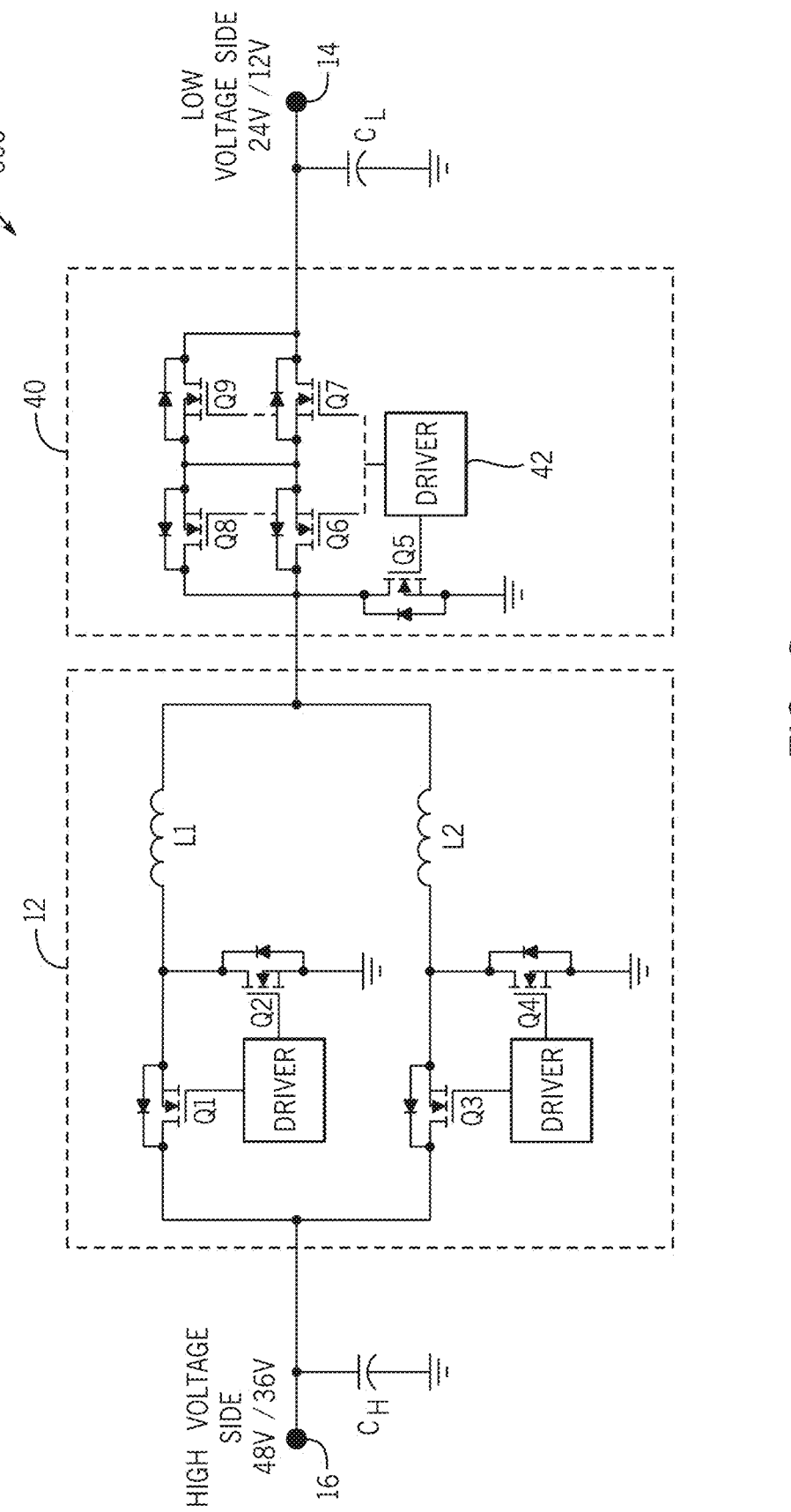
FIG. 6 illustrates the DC-DC converter with a secondary switching network combining the benefits of the secondary switching networks of FIGS. 4 and 5.

FIG. 6 shows a power converter 600 that combines the concepts of the power converter 500 of FIG. 5 and the power converter 400 of FIG. 4. Specifically, in the secondary switching network 40, the MOSFET Q5 is provided to control current flow from the low side to the high side when the high side has a lower voltage of the two (i.e., to operate the power converter 600 in the buck-in-boost mode), and MOSFETs Q8 and Q9 are provided to reduce conduction losses while still providing the functionality of disrupting current in either direction (high to low or low to high) and blocking voltage in either direction. A gate driver 42 is controlled by a controller (not shown) to operate Q6-9 as discussed with respect to FIG. 4 and to operate Q5 as discussed with respect to FIG. 5.

The MOSFETs Q1-Q9 shown herein are n-channel enhancement type MOSFETs, which are normally open until a gate voltage is applied. In other example, the MOSFETs could be p-channel type. In other examples, the MOSFETs could be depletion types (either n-channel or p-channel).

Although the present power converters 200, 300, 400, 500, 600 are described as including MOSFETs, it should be understood that other types of semiconductor switches could be used, such as insulated gate bipolar transistors (IGBTs) or bipolar junction transistors (BJTs). For implementations in which the power converter's topology takes advantage of the intrinsic body diode in a MOSFET, an IGBT with a freewheeling diode, a reverse conducting insulated gate bipolar transistor (RC-IGBT), or an integrated gate-commutated thyristor (IGCT) could be used.

Further, note that while the present examples are discussed with respect to a bidirectional converter, many of the solutions are useful and capable of implementation in a DC-DC boost converter.

Thus, referring to FIG. 5 in particular, the present example is of a power converter 500 comprising a low side terminal 14, a high side terminal 16, and a common (ground) terminal 15. A DC-DC converter 12 is electrically connected between the high side terminal 16 and the low side terminal 14. The DC-DC converter 12 is configured to operate in at least a boost mode so as to step up a first voltage input at the low side terminal 14 to a second voltage output at the high side terminal 16. The power converter 500 comprises a first transistor Q6 having a body diode oriented in a first direction and a second transistor Q7 having a body diode oriented in an opposite second direction. The first and second transistors Q6, Q7 are in series with one another and electrically connected between the low side terminal 14 and the DC-DC converter 12. The power converter 500 comprises a third transistor Q5 connected between the common terminal 15 and the DC-DC converter 12. The first, second, and third transistors Q5-7 are controllable as switches to at least temporarily operate the power converter 500 to step down the first voltage input at the low side terminal 14 to a third voltage output at the high side terminal 16.

The power converter 500 further comprises a gate driver 36 controlling operation of the first, second, and third transistors Q5-7 as switches. The gate driver 36 is configured to turn the first and second transistors Q6, Q7 on and simultaneously to turn the third transistor Q5 off. The gate driver 36 is configured to turn the third transistor Q5 on and simultaneously to turn the first and second transistors Q6, Q7 off.

A controller 38 is in signal communication with the gate driver 36. The controller 38 is configured to compare a measured voltage at the high side terminal 16 to a measured voltage at the low side terminal 14. In response to determining that the measured voltage at the high side terminal 16 is less than the measured voltage at the low side terminal 14, the controller 38 controls the gate driver 36 to operate the first, second, and third transistors Q5-7 as switches to step down the first voltage input at the low side terminal 14 to the third voltage output at the high side terminal 16. In response to determining that the measured voltage at the high side terminal 16 is greater than the measured voltage at the low side terminal 14, the controller 38 controls the DC-DC converter 12 to operate in the boost mode.

In one example, as shown in FIG. 6, the power converter 600 further comprises a fourth transistor Q8 having a body diode oriented in the first direction and a fifth transistor Q9 having a body diode oriented in the second direction. The fourth and fifth transistors Q8, Q9 are in series with one another and in parallel with the first and second transistors Q6, Q7, and are electrically connected between the low side terminal 14 and the DC-DC converter 12. The first, second, third, fourth, and fifth transistors Q5-Q9 are controllable as switches to at least temporarily operate the power converter 600 to step down the first voltage input at the low side terminal 14 to the third voltage output at the high side terminal 16.

In some examples, the first and second transistors Q6, Q7 are oriented such that their respective sources face one another. In some examples, the fourth and fifth transistors Q8, Q9 are also oriented such that their respective sources face one another.

In the examples shown herein, the third transistor Q5 is connected between the first transistor Q6 and the common terminal 15 and between the DC-DC converter 12 and the common terminal 15 (i.e., the connection node for Q5 is between the DC-DC converter 12 and Q6). In another example, the third transistor Q5 is connected between the first transistor Q6 and the common terminal 15 and between the second transistor Q7 and the common terminal 15 (i.e., the connection node for Q5 is between Q6 and Q7). In still another example, the third transistor Q5 is connected between the low side terminal 14 and the common terminal 15 and between the second transistor Q7 and the common terminal 15 (i.e., the connection node for Q5 is between Q7 and the low side terminal 14). Moreover, the transistors could be arranged as described in the examples above, only between the high side terminal 16 and the DC-DC converter 12 instead of between the low side terminal 14 and the DC-DC converter 12 as shown in FIGS. 5 and 6.

In some examples, the DC-DC converter 12 is also configured to operate in a buck mode so as to step down the second voltage input at the high side terminal 16 to the first voltage output at the low side terminal 14. That is, in buck mode, the second voltage $V_2$ is input to the high side terminal 16 and stepped down to the lower first voltage $V_1$, which is output from the low side terminal 14. In boost mode, the first voltage $V_1$ is input to the low side terminal 14 and stepped up to the higher second voltage $V_2$, which is output at the high side terminal 16. However, the exemplary power converters 500, 600 can also buck while operating in boost mode as described above, such that the first voltage $V_1$ is input to the low side terminal 14 and stepped down to a lower third voltage $V_3$, which is output at the high side terminal 16.

In some examples, the DC-DC converter 12 has an interleaved topology.

In some examples, the DC-DC converter 12 is a non-isolated converter.

In some examples, at least one of the first, second, and third transistors Q5-Q7 is a MOSFET.

The noted controllers 20, 38 include a processing system, a memory system, and an input/output (I/O) system. In some embodiments, the processing system can be configured to execute an executable program (e.g., software) from the memory system. Note that, in some embodiments, the processing system can be configured to execute one or more portions of executable program via programmed logic (e.g., implemented in hardware and/or firmware), in addition to, or in lieu of, software stored in the memory system (e.g., the executable program can be stored, at least in part, within circuitry of the processing system, in addition to, or in lieu of, the memory system).

In some embodiments, the memory system can include any suitable storage device or devices that can be used to store instructions, values, etc., that can be used, for example, by the processing system to perform processes described herein and to communicate with one or more other components external to the power converter via a communications system(s) (e.g., implemented as part of the I/O system), etc. Memory system can include any suitable volatile memory, non-volatile memory, storage, or any suitable combination thereof. In some embodiments, memory system can be configured to store executable program, which may include a set of computer readable instructions.

In some embodiments, the I/O system can provide communication between the processing system and/or one or more other components, such as batteries, external controllers, external software applications, one or more loads, etc. The I/O system can include any suitable hardware, firmware, and/or software for communicating information over a communication network or combination of communication networks, which can facilitate communication with other components using any suitable wired and/or wireless connections, such as for example, a network bus.

In some embodiments, the processing system can load and execute an executable program from the memory system (and/or via logic implemented within the processing system), access data stored within the memory system, and direct the power converter to operate in several different modes or states as discussed above. For example, the processing system can load and execute an executable program in order to operate the power converter in the buck mode, in the boost mode, or in the "buck-in-boost" mode described hereinabove with respect to FIGS. 5 and 6.

In the above description, certain terms have been used for brevity, clarity, and understanding. No unnecessary limitations are to be inferred therefrom beyond the requirement of the prior art because such terms are used for descriptive purposes and are intended to be broadly construed. The order of method steps or decisions shown in the Figures and described herein are not limiting on the appended claims unless logic would dictate otherwise. It should be understood that the decisions and steps can be undertaken in any logical order and/or simultaneously. The different systems and methods described herein may be used alone or in combination with other systems and methods. It is to be expected that various equivalents, alternatives and modifications are possible within the scope of the appended claims.

What is claimed is:

1. A power converter comprising:

a low side terminal;

a high side terminal;

a common terminal;

a DC-DC converter electrically connected between the high side terminal and the low side terminal, the DC-DC converter being configured to operate in at least a boost mode so as to step up a first voltage input at the low side terminal to a second voltage output at the high side terminal;

a first transistor having a body diode oriented in a first direction;

a second transistor having a body diode oriented in an opposite second direction, the first and second transistors being in series with one another and electrically connected between the low side terminal and the DC-DC converter; and a third transistor connected between the common terminal and the DC-DC converter, wherein the first, second, and third transistors are controllable as switches to at least temporarily operate the power converter to step down the first voltage input at the low side terminal to a third voltage output at the high side terminal.

2. The power converter of claim 1, further comprising a gate driver controlling operation of the first, second, and third transistors as switches;

wherein the gate driver is configured to turn the first and second transistors on and simultaneously to turn the third transistor off; and wherein the gate driver is configured to turn the third transistor on and simultaneously to turn the first and second transistors off.

3. The power converter of claim 2, further comprising a controller in signal communication with the gate driver;

wherein the controller is configured to compare a measured voltage at the high side terminal to a measured voltage at the low side terminal; and wherein in response to determining that the measured voltage at the high side terminal is less than the measured voltage at the low side terminal, the controller controls the gate driver to operate the first, second, and third transistors as switches to step down the first voltage input at the low side terminal to the third voltage output at the high side terminal; and wherein in response to determining that the measured voltage at the high side terminal is greater than the measured voltage at the low side terminal, the controller controls the DC-DC converter to operate in the boost mode.

4. The power converter of claim 1, further comprising:

a fourth transistor having a body diode oriented in the first direction; and a fifth transistor having a body diode oriented in the second direction;

wherein the fourth and fifth transistors are in series with one another and in parallel with the first and second transistors, and are electrically connected between the low side terminal and the DC-DC converter; and wherein the first, second, third, fourth, and fifth transistors are controllable as switches to at least temporarily operate the power converter to step down the first voltage input at the low side terminal to the third voltage output at the high side terminal.

5. The power converter of claim 1, wherein the first and second transistors are oriented such that their respective sources face one another.

6. The power converter of claim 1, wherein the third transistor is connected between the common terminal and the DC-DC converter and between the first transistor and the common terminal.

7. The power converter of claim 1, wherein the DC-DC converter is also configured to operate in a buck mode so as to step down the second voltage input at the high side terminal to the first voltage output at the low side terminal.

8. The power converter of claim 1, wherein the DC-DC converter has an interleaved topology.

9. The power converter of claim 1, wherein the DC-DC converter is a non-isolated converter.

10. The power converter of claim 1, wherein at least one of the first, second, and third transistors is a MOSFET.

* * * * *